US 9,931,894 B2

(12) United States Patent
Iwabuchi

(10) Patent No.: US 9,931,894 B2
(45) Date of Patent: Apr. 3, 2018

(54) PNEUMATIC TIRE

(71) Applicant: BRIDGESTONE CORPORATION, Tokyo (JP)

(72) Inventor: Sotaro Iwabuchi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 276 days.

(21) Appl. No.: 14/652,620

(22) PCT Filed: Dec. 16, 2013

(86) PCT No.: PCT/JP2013/007376
§ 371 (c)(1),
(2) Date: Jun. 16, 2015

(87) PCT Pub. No.: WO2014/108961
PCT Pub. Date: Jul. 17, 2014

(65) Prior Publication Data
US 2015/0336432 A1 Nov. 26, 2015

(30) Foreign Application Priority Data
Jan. 9, 2013 (JP) ................. 2013-001836

(51) Int. Cl.
*B60C 13/00* (2006.01)
*B60C 5/00* (2006.01)
*B60C 13/04* (2006.01)
(52) U.S. Cl.
CPC .............. *B60C 13/001* (2013.01); *B60C 5/00* (2013.01); *B60C 13/04* (2013.01)
(58) Field of Classification Search
CPC ............................. B60C 13/001; B60C 13/04
See application file for complete search history.

(56) References Cited

U.S. PATENT DOCUMENTS

| 4,413,663 A | 11/1983 | Sullenger |
| 2002/0050242 A1* | 5/2002 | Hendrie ................. B60C 13/00 116/34 A |
| 2006/0266456 A1* | 11/2006 | Speyer ................. B60C 13/001 152/524 |

FOREIGN PATENT DOCUMENTS

| CN | 101583502 A | 11/2009 |
| DE | 3924459 A1 | 3/1990 |

(Continued)

OTHER PUBLICATIONS

International Search Report for PCT/JP2013/007376 dated Mar. 11, 2014.

*Primary Examiner* — Joseph S Del Sole
*Assistant Examiner* — Cedrick Williams
(74) *Attorney, Agent, or Firm* — Sughrue Mion, PLLC

(57) ABSTRACT

A pneumatic tire including a pair of bead portions, a pair of sidewall portions extending from the bead portions, a tread portion extending across the respective sidewall portions, and a decorative band having a smooth surface and formed on the sidewall portion, wherein: the outermost end in the tire radial direction of the decorative band is positioned on the inner side in the tire radial direction than the largest width position of the tire; the decorative band includes a plurality of decorative lines each extending in the tire circumferential direction and having higher brightness than the base color of the tire; brightness of the decorative line having the highest brightness among the decorative lines is at least 80%; and brightness and/or hue of the decorative line having the highest brightness is different from brightness and/or hue of at least one of other decorative lines.

7 Claims, 3 Drawing Sheets

(56) References Cited

FOREIGN PATENT DOCUMENTS

| | | |
|---|---|---|
| DE | 10250787 A1 | 5/2004 |
| DE | 102004032801 A1 | 2/2006 |
| DE | 102011053416 A1 | 3/2012 |
| EP | 0689948 A2 | 1/1996 |
| JP | 2000-255223 A | 9/2000 |
| JP | 4666109 B1 | 4/2011 |
| JP | 2011235686 A | 11/2011 |
| JP | 2012-61922 A | 3/2012 |
| JP | 2012-76555 A | 4/2012 |
| JP | 2012-101392 A | 5/2012 |
| WO | WO 0013922 A1 * 3/2000 ........... B60C 13/001 |
| WO | 2012/004947 A | 1/2012 |

\* cited by examiner

PNEUMATIC TIRE

CROSS REFERENCE TO RELATED APPLICATIONS

This application is a National Stage of International Application No. PCT/JP2013/007376 filed Dec. 16, 2013, claiming priority based on Japanese Patent Application No. 2013-001836 filed Jan. 9, 2013, the contents of all of which are incorporated herein by reference in their entirety.

TECHNICAL FIELD

The present invention relates to a pneumatic tire provided with a decorative band having a smooth surface and formed on a sidewall portion of the tire.

BACKGROUND ART

Replacing a wheel rim, to be assembled with an automobile tire, with another rim having a larger rim diameter (what is called "inch up") in order to make the tire look massive and improve appearance thereof has been widely practiced. However, there arises a problem of an increase in rolling resistance or the like when a large diameter wheel rim is assembled with a large diameter tire because then unsprung weight increases due to an increase in the wheel weight.

In view of this, there has been proposed a pneumatic tire provided with a decorative band (a color line) formed by printing, painting, a seal, a sticker or the like on a sidewall portion of the tire, as disclosed in PTL 1. The pneumatic tire can make an apparent rim diameter of a wheel rim assembled therewith look larger than the actual size without so much increasing the unsprung weight of a vehicle.

CITATION LIST

Patent Literature

PTL 1: JP2012-076555

SUMMARY

A single color line is formed in the tire circumferential direction in the tire provided with a decorative band of PTL 1. This decorative band is satisfactory in terms of decorativeness but unsatisfactory in visibility thereof, i.e. in terms of making an apparent rim diameter of the wheel rim look larger than the actual size, because viewers continue to feel somewhat odd about the decorative band.

Our pneumatic tire aims at effectively solving the problems described above and an object thereof is to provide a pneumatic tire capable of making an apparent rim diameter of a wheel rim look larger than the actual size without so much increasing rolling resistance of the tire.

Our pneumatic tire is a pneumatic tire provided with a decorative band having a smooth surface and formed on a sidewall portion of the tire, wherein: the outermost end in the tire radial direction of the decorative band is positioned on the inner side in the tire radial direction than the largest width position of the tire; the decorative band includes a plurality of decorative lines each extending in the tire circumferential direction and having higher brightness than the base color of the tire; brightness of the decorative line having the highest brightness among the decorative lines is at least 80%; and brightness and/or hue of the decorative line having the highest brightness is different from brightness and/or hue of at least one of other decorative lines.

Positions and dimensions such as those relevant to the outermost end in the tire radial direction of the decorative band are to be measured in a tire assembled with a prescribed rim and inflated at the normal internal pressure with no load exerted thereon in our tire.

In our tire, a "prescribed rim" represents a standard (or "approved" or "recommended") rim prescribed for each tire size by an industrial standard which is valid in an area where the tire is manufactured and used, and examples of the industrial standard include: "Year Book" of "THE TIRE AND RIM ASSOCIATION INC." of the United States; "STANDARDS MANUAL" of "The European Tyre and Rim Technical Organisation" of Europe; and "JATMA YEAR BOOK" of "The Japan Automobile Tyre Manufacturers Association, Inc." of Japan.

"Normal internal pressure" represents internal air pressure prescribed to correspond to the maximum loading capacity of a tire by the industrial standards. "The maximum loading capacity" represents the maximum mass which may be loaded on a tire and is prescribed according to size (ply rating) of the tire by the industrial standards.

In our tire, "the largest tire width position" represents the largest width position of a tire in an outer contour imaginary curve, drawn by excluding irrelevant projections such as characters and rim guards, of a sidewall portion in a state where the tire has been assembled with the aforementioned prescribed rim and inflated at the maximum air pressure prescribed by the relevant industrial standard with no load exerted thereon.

Brightness, saturation, and hue are defined by the HSV model in our pneumatic tire.

Brightness is an index representing the degree of brightness of a color. Brightness 100% represents the brightest color and brightness 0% represents pitch black in each hue.

Saturation is an index representing the degree of purity of a color in the range of 0% to 100%. High saturation represents a pure color and low saturation represents a dull color. Hue is an index indicating the position of a color in spectrum by an angle in the range of 0 degree to 360 degrees. 0 degree represents red and 60, 120, 180, 240, 300 degrees represent yellow, green, cyan, blue, and magenta, respectively.

Brightness, saturation and hue are determined in our pneumatic tire by: first measuring brightness and the like of an object such as a decorative band to be measured, based on a system other than the HSV color system such as a Lab color space, by using a spectrophotometer (e.g. a spectrophotometer manufactured by Konica Minolta, Inc.); and then converting the values thus measured into those based on the HSV color system by using a required software such as "photoshop®".

According to our pneumatic tire, it is possible to make an apparent rim diameter of a wheel rim look larger than the actual size without giving an add impression to viewers, as compared with the conventional pneumatic tire, while avoiding deterioration of rolling resistance of the tire.

DETAILED DESCRIPTION

Figure 1:
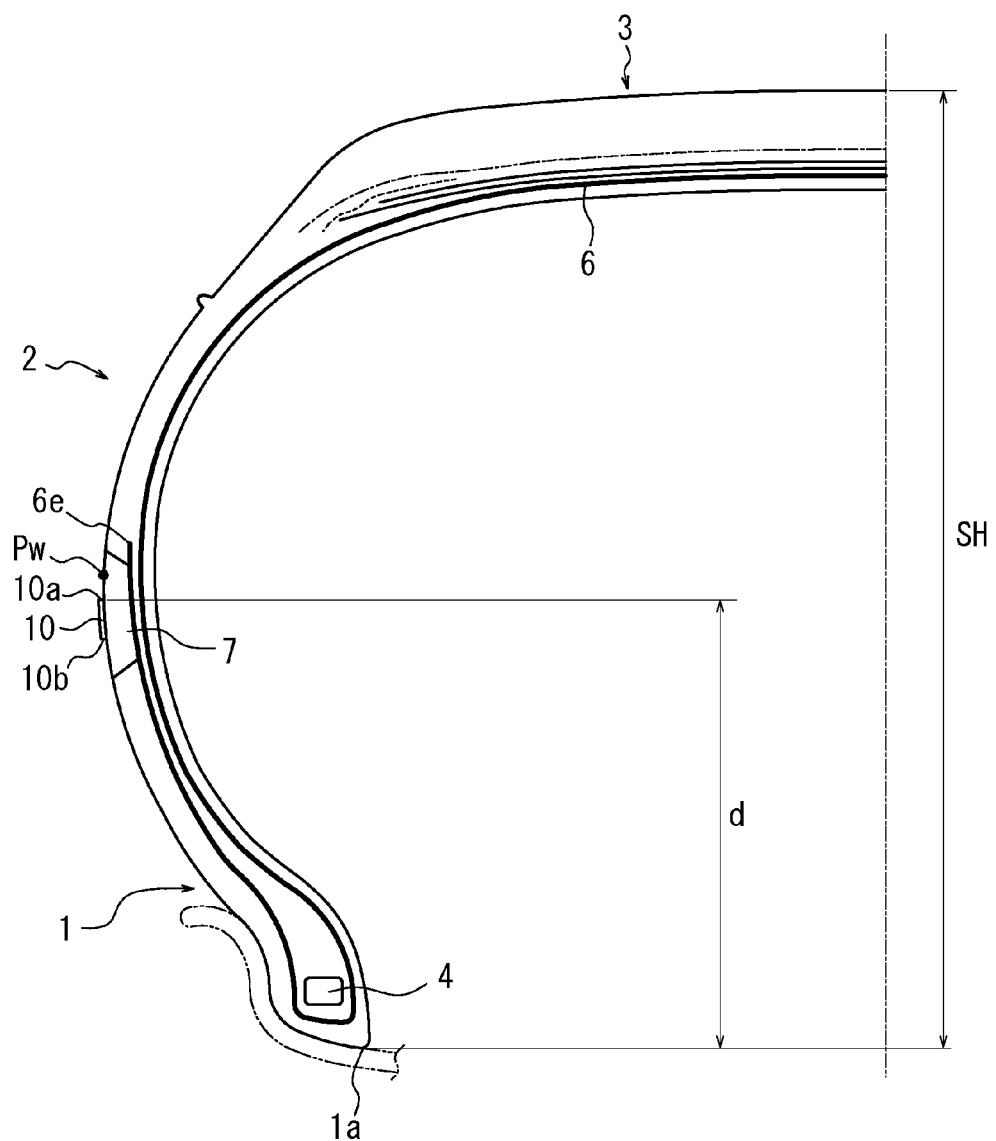
FIG. 1 is a cross sectional view in the tire width direction of a half portion of our pneumatic tire according to one embodiment thereof in a state where the tire has been assembled with a prescribed rim and inflated at predetermined internal pressure with no load exerted thereon.

One embodiment of our pneumatic tire will be demonstratively described with reference to the drawings hereinafter.

The following descriptions are provided only for a demonstrative purpose and by no means restrict structures, effects and the like of respective portions of the tire. A pneumatic tire exemplarily shown in FIG. 1 has a pair of bead portions 1 each having a bead core 4 embedded therein, a pair of sidewall portions 2 extending from the bead portions 1 toward the outer side in the tire radial direction, and a tread portion 3 extending across the respective sidewall portions 2. The pneumatic tire further has a carcass ply 6 provided to have a toroidal shape between the pair of bead cores 4.

Figure 2:
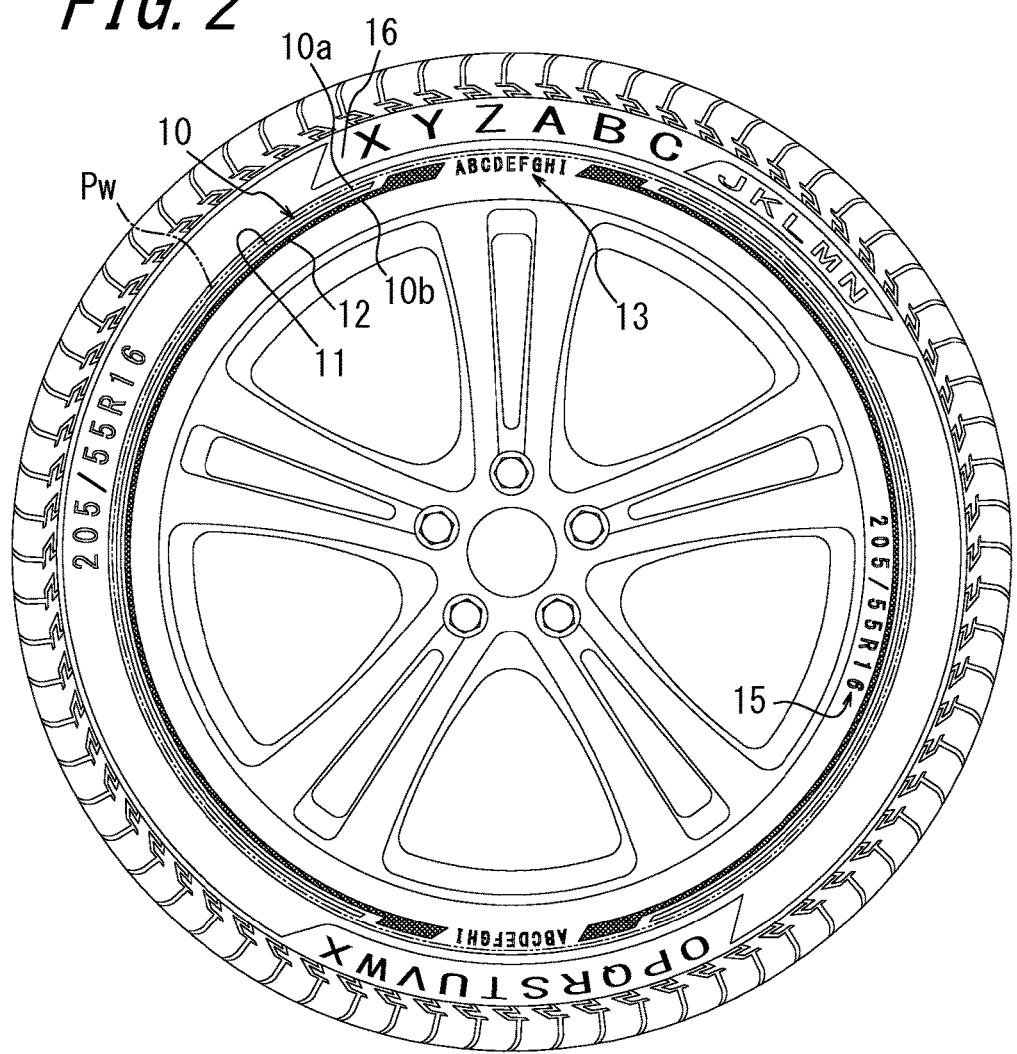
FIG. 2 is a side view of the tire shown in FIG. 1.

A decorative band 10 annularly extending in the tire circumferential direction is formed on the inner side in the tire radial direction than the largest tire width position Pw of the sidewall 2, as shown in FIG. 1 and FIG. 2. A width in the tire radial direction of the decorative band 10 may be 8 mm or more, for example. The decorative band 10 has a smooth and flat surface(s). Serial markings 15 constituted of projections (and recesses) are formed on the inner side in the tire radial direction of the decorative band 10 and serial markings 16 constituted of projections (and recesses) are formed on the outer side in the tire radial direction of the decorative band 10. The serial markings 15 and the serial markings 16 represent tire size, a mark, or the like, respectively.

The decorative band 10 includes a plurality (two in the example shown in the drawings) of decorative lines 11, 12 each extending in the tire circumferential direction and having brightness higher than that of the tire base color. The decorative line 11 on the outer side in the tire radial direction is white (brightness: 100%, saturation: 0%, hue: 0°) and the decorative line 12 on the inner side in the tire radial direction is green (brightness: 60%, saturation: 66%, hue: 150°).

A mark portion 13 constituted of marks such as characters, graphics or the like may be formed in a disconnected portion of the decorative line 11 and/or the decorative line 12, as shown in FIG. 2. The mark portion 13 has substantially the same width in the tire radial direction as the width in the tire radial direction of the decorative band 10 in the embodiment shown in FIG. 2.

In the tire of the present embodiment, weight increase thereof can be well suppressed, as compared with a case where a decorative band is formed by projections and recesses such as ridges, because the decorative band 10 of the former has smooth and flat surfaces. The decorative band 10 having smooth and flat surfaces can be formed, for example, by printing or attaching seals.

The decorative line 11 and/or the decorative line 12 may be formed in an intermittent manner in the tire circumferential direction (not shown in the drawings). Further alternatively, the decorative band 10 may include three or more decorative lines.

FIG. 1 is a cross sectional view of one half portion of the tire. It is acceptable that the other half portion of the tire lacks the decorative band 10 and the tire is mounted on a vehicle such that the one half portion of the tire provided with the decorative band 10 faces the outer side in the width direction of the vehicle. Alternatively, the other half portion of the tire may have decorative portions symmetric to the decorative portions of the one half portion of the tire shown in FIGS. 1 and 2.

Visibility of the decorative band 10 improves and a viewer can well recognize the decorative band 10 from a position remote from the tire because the decorative lines 11, 12 each have brightness higher than brightness of the tire base color which is substantially black, as described above.

The decorative band 10 includes: the decorative line 11 having the highest brightness (at least 80%) among the decorative lines; and the decorative line 12 of which brightness and/or hue (both brightness and hue in the example of the present embodiment) is different from brightness and/or hue of the decorative line 11. An apparent rim diameter of a wheel rim looks larger than the actual size in this case because the decorative line 11 having high brightness reflects light and looks as if it were a rim flange 21 having high brightness.

Further, provision of the decorative line 12 having brightness different from that of the decorative line 11, i.e. provision of a plurality of different decorative lines, overcomes the odd feeling caused by the conventional decorative band constituted of a single decorative line and gives a viewer a good three-dimensional image of the entire wheel rim portion (in the tire radial direction thereof in particular), thereby successfully making the wheel rim look larger than the actual size without causing the viewer to feel odd.

The decorative line 11 on the outermost side in the tire radial direction has the highest brightness among the decorative lines in the tire of the present embodiment. Such a decorative line 11 as described above, positioned close to the outermost portion in the tire radial direction of the wheel rim, reflects light and looks as if it were a rim flange 21 having high brightness. Further, the decorative line 12 formed on the inner side in the tire radial direction than the decorative line 11 and having brightness not exceeding that of the decorative line 11 looks as if it were an outer rim 22 of a disc portion on the inner side in the tire radial direction of the rim flange. An apparent rim diameter of the wheel rim looks larger than the actual size by these effects in the tire of the present embodiment.

Further, it is possible to emphasize the brand image and/or the added values of the tire by making the decorative line 12 take on a chromatic color. For example, the decorative line 12 colored green as in the present embodiment reminds a viewer of tree foliage and possibly makes him/her feel as if the tire is environmentally friendly.

The outermost end 10a in the tire radial direction of the decorative band 10 is positioned on the inner side in the tire radial direction than the largest tire width position Pw of the tire, as shown in FIG. 1 and FIG. 2. Providing the decorative band 10 in a region experiencing relatively small strains when the tire is rotated or the like as in the present embodiment suppresses occurrence of exfoliation and cracks in the decorative band and thus improves durability thereof.

A distance d in the tire radial direction between the radially outermost end 10a of the decorative band 10 and the bead base line 1a is preferably set to be 0.35×SH≤d<0.50×SH as shown in FIG. 1, provided that SH represents a cross sectional height of the tire, in terms of improving visibility of the decorative band 10 with well suppressing exfoliation and cracks in the decorative band 10 and also in terms of ensuring a sufficiently large space for accommodating the serial markings indicating the tire size, a mark or the like.

The distance d<0.35×SH may deteriorate visibility of the decorative band and fail to ensure a sufficiently large space for accommodating the serial markings on the inner side in the tire radial direction of the decorative band. The distance d≥0.50×SH results in: provision of the decorative band 10 in a region experiencing relatively large strains when the tire is rotated or the like, which possibly makes it difficult to suppress exfoliation and cracks of the decorative band in a satisfactory manner; and failure in ensuring a sufficiently large space for accommodating the serial markings on the outer side in the tire radial direction of the decorative band.

A width $w_1$ in the tire radial direction of the decorative line 11 and a width $w_2$ in the tire radial direction of the decorative line 12 of the decorative band 10 are preferably in the range of 2% to 10% of the cross sectional height SH of the tire, respectively, in terms of improving visibility of the decorative band with ensuring good durability of the decorative band against strains of the tire.

The width $w_1/w_2$<2% of SH makes the decorative line too narrow, whereby visibility of the decorative line may deteriorate. The width $w_1/w_2$>10% of SH facilitates concentration of strains at end portions of the decorative line and thus exfoliation therein, whereby durability of the decorative line may deteriorate.

The decorative line 11 having the highest brightness preferably takes on a white color of brightness 100% in terms of improving visibility of the decorative band 10 and ensuring that an apparent rim diameter of the wheel rim looks larger than the actual size.

It is preferable that the decorative lines 11, 12 are disposed to be distanced from each other in the tire radial direction in terms of improving visibility of each of the decorative lines 11, 12. In a case where the decorative lines 11, 12 are provided to be adjacent or too close to each other in the tire radial direction, these decorative lines 11, 12 tend to look like a single line and may fail to cause a visual effect as desired. In this connection, a width $w_g$ in the tire radial direction of a gap 14 between the decorative lines 11, 12 may be 1.5 mm, for example.

It is preferable that an end portion 6e (see FIG. 1) of the carcass ply 6 is disposed in a tire radial region other than a tire radial portion between the innermost end 10b and the outermost end 10a in the tire radial direction of the decorative band 10 (i.e. a tire radial region on the outer side in the tire radial direction than the radially outermost end 10a of the decorative band 10 in the embodiment shown in FIG. 1) in terms of keeping a safe distance between the decorative band 10 and the end portion 6e of the carcass ply 6 experiencing large strains and thus enhancing durability of the decorative band 10.

The decorative line 11 having the highest brightness has good visibility and looks thick. Accordingly, making the width $w_1$ in the tire radial direction of the decorative line 11 having the highest brightness narrower than the width $w_2$ in the tire radial direction of the decorative line 12 can achieve a good balance between the decorative line 11 and the decorative line 12, prevent a viewer from having an odd impression thereon, and reliably make an apparent rim diameter of the wheel rim look larger than the actual size.

Setting brightness of the mark portion 13 higher than the brightness of the decorative line 11 having the highest brightness among the decorative lines is preferable in terms of making the mark portion 13 conspicuous without deteriorating the effect of the decorative line 11.

Figure 3:
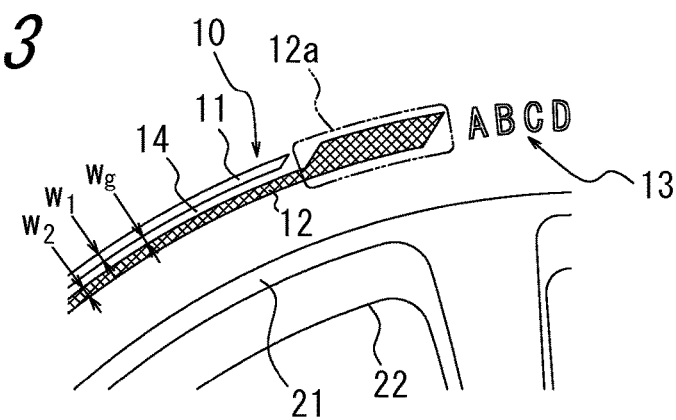
FIG. 3 is a view showing primary portions of FIG. 2 in an enlarged manner.

Further, enlarging the width in the tire radial direction of the decorative line 12 having the lowest brightness in a portion thereof adjacent in the tire circumferential direction to the mark portion 13, to form an enlarged width portion 12a so that the decorative line 12 terminates at the enlarged width portion 12a, as shown in FIG. 3, is preferable in terms of making brightness of the surroundings of the mark portion 13 lower than the mark portion 13 and thus enhancing visibility of the mark portion 13.

UV curable ink is preferably used in a case where the decorative band 10 is formed by printing. Use of UV curable ink can improve workability in this case because the ink is instantly cured by irradiation of UV thereon, whereby exfoliation of a resulting decorative band and ink drop in forming the decorative band can be both suppressed.

Yet further, a contamination preventive rubber layer 7 not containing an anti-oxidant is provided on the tire outer surface side of the carcass ply 6 in the tire of the present embodiment, as shown in FIG. 1. The decorative band 10 is adjacent to the contamination preventive rubber layer 7. This structure can effectively suppress contamination of the decorative band 10 by an anti-oxidant.

Examples of a rubber component of the contamination preventive rubber layer 7 include natural rubber (NR), butyl rubber (IIR), halogenated butyl rubber, isoprene rubber (IR), butadiene rubber (BR), styrene-butadiene rubber (SBR), chloroprene rubber (CR), acrylonitrile-butadiene rubber (NBR), ethylene-propylene-diene terpolymer (EPDM), and the like. These rubbers may be used as the rubber component either solely or in combination of two or more thereof. In a case where ethylene-propylene-diene terpolymer is blended in the contamination preventive rubber layer, the content of ethylene-propylene-diene terpolymer in the contamination preventive rubber layer is preferably at least 80 parts by weight with respect to 100 parts by weight of the rubber component of the contamination preventive rubber layer.

In this connection, presence of butyl-based rubber in at least a portion of the contamination preventive rubber layer 7 suppresses permeation of an anti-oxidant through the contamination preventive rubber layer 7, thereby effectively preventing the anti-oxidant contained in other rubber layers from contaminating the decorative band 10. Further, in a case where the contamination preventive rubber layer 7 contains inorganic clay minerals, the inorganic clay minerals further suppress permeation of an anti-oxidant through the contamination preventive rubber layer, thereby further enhancing an effect caused by the contamination preventive rubber layer of preventing the other rubber layers from contaminating the decorative band 10.

Figure 4:
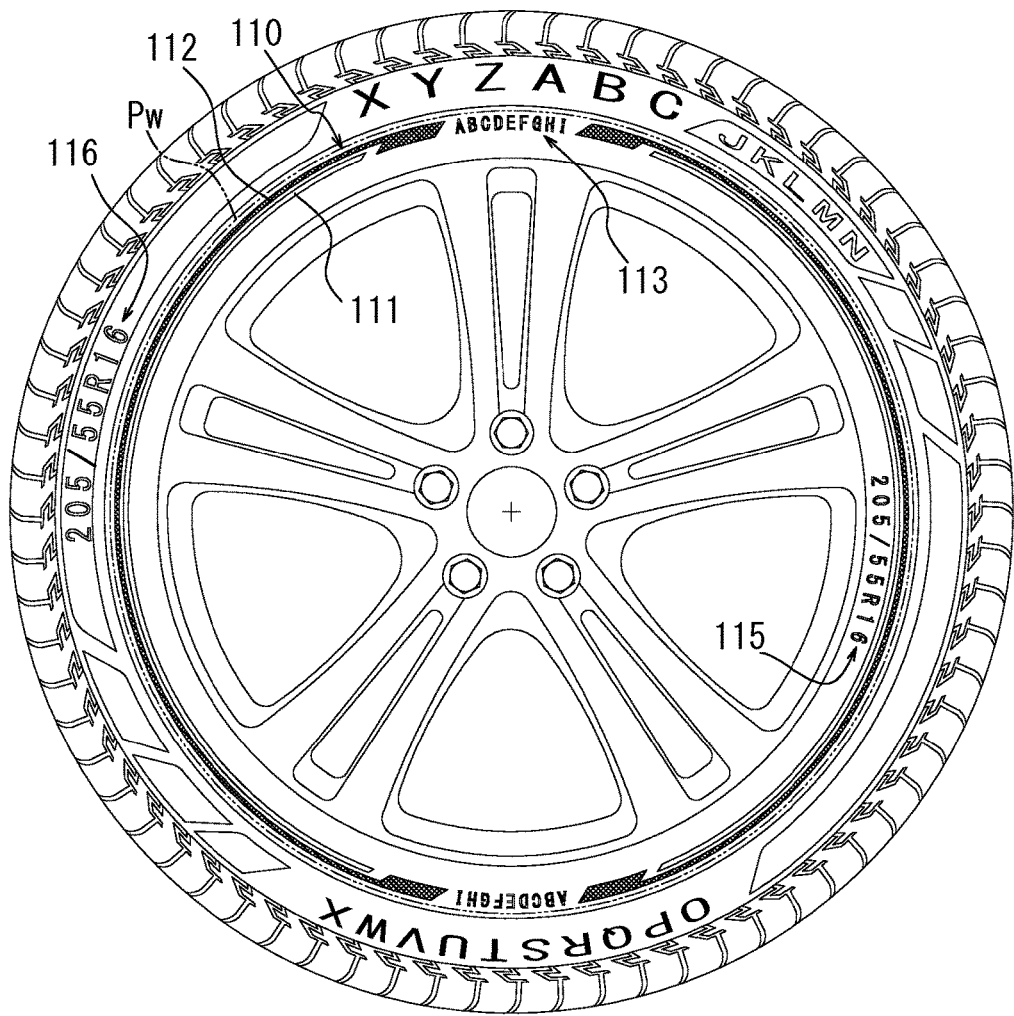
FIG. 4 is a side view, similar to FIG. 2, showing our pneumatic tire according to another embodiment thereof.
Figure 5:
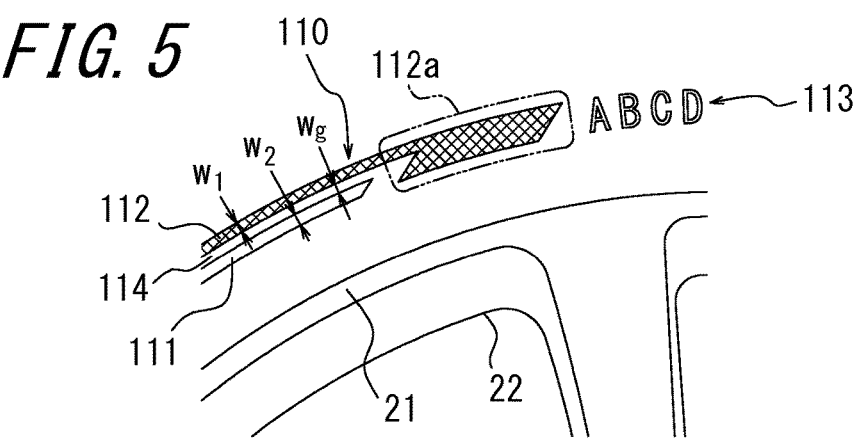
FIG. 5 is a view showing primary portions of FIG. 4 in an enlarged manner.

Next, a tire according to another embodiment of our pneumatic tire is shown in FIG. 4 and FIG. 5. A decorative band 110 annularly extending in the tire circumferential direction is formed on the inner side in the tire radial direction than the largest tire width position Pw of the sidewall 2 in the tire. The decorative band 110 includes: a decorative line 111 having the highest brightness (at least 80%) among decorative lines and located on the inner side in the tire radial direction; and a decorative line 112 having the lowest brightness among the decorative lines and located on the outer side in the tire radial direction. The decorative line 111 is white (brightness: 100%, saturation: 0%, hue: 0°) and the decorative line 112 is blue (brightness: 60%, saturation: 100%, hue: 219°). Serial markings 115 and serial markings 116, similar to the serial markings 15 and the serial markings 16 shown in FIGS. 2 and 3, are formed on the inner side and the outer side in the tire radial direction of the decorative band 110, respectively. A gap 114 having a width $w_g$ in the tire radial direction is formed between the decorative line 111 and the decorative line 112, as shown in FIG. 5. A portion adjacent in the tire circumferential direction to a mark portion 113, of the decorative line 112 having the lowest brightness, is enlarged in a width thereof in the tire radial direction, to form an enlarged width portion 112a so that the decorative line 112 terminates at the enlarged width portion 112a.

An apparent rim diameter of the wheel rim looks larger than the actual size in the tire of the present embodiment because the decorative line 111 having the highest brightness looks as if it were the rim flange 21. Further, provision of the decorative line 112 having a chromatic color on the outer side in the tire radial direction emphasizes color tone of the decorative line 112 and thus successfully enhances a brand-image appealing effect on customers.

EXAMPLES

Examples tires 1 to 10 according to our pneumatic tire and Comparative Example tires 1 to 4 were prepared as test tires, respectively. Each test tire has: tire size of 205/55R16; a tire cross sectional height SH of 114 mm; and a decorative band including two decorative lines (a single decorative line in Comparative Example 2) formed on the inner side in the tire radial direction than the largest tire width position (the distance in the tire radial direction between the largest tire width position and the bead base line is 52.5 mm, which is 0.46×the tire cross sectional height SH), wherein each of the decorative lines extends in the tire circumferential direction and has higher brightness than the tire base color (brightness: 10%, saturation: 0%, hue: 0°). The respective decorative lines keep a distance of 1.5 mm therebetween in the tire radial direction in each of the test tires other than Comp. Example 2 tire.

Table 1 shows for each of the test tires: brightness of the decorative line on the outer side in the tire radial direction; brightness of the decorative line on the inner side in the tire radial direction; a ratio of the distance d in the tire radial direction between the radially outermost end of the decorative band and the bead base line, with respect to the tire cross sectional height SH; a ratio of the width $w_1(=w_2)$ in the tire radial direction of each decorative line of the decorative band, with respect to the tire cross sectional height SH; and whether or not the folded-up end of the carcass ply is disposed in a tire radial portion between the innermost end and the outermost end in the tire radial direction of the decorative band, i.e. whether or not the ply end overlaps the decorative band. "Yes" represents that the ply end overlaps the decorative band and "No" represents that the ply end does not overlap the decorative band.

<Visibility of Decorative Lines>

Each of the test tires was assembled with a prescribed rim and visibility of the decorative band thereof was investigated. Specifically, 20 viewers observed each of the test tires thus prepared and a questionnaire survey was conducted for these viewers regarding whether or not visibility of the decorative bands improved, i.e. an apparent wheel rim diameter looked larger than the actual size (larger than the same wheel rim in the conventional tire). The results are shown in Table 1. With regard to the evaluation criteria of visibility, the number of the viewers who answered that the apparent wheel rim diameter looked larger than the actual size was counted and the grade A represents the number≥18, the grade B represents 10≤the number≤17, and the grade C represents the number≤9. Table 1 also shows for each test tire the specific number of the viewers who answered that the apparent wheel rim diameter looked larger than the actual size.

<Durability of Decorative Band>

Durability of the decorative band of each test tire was determined by: assembling the test tire with a prescribed rim and inflating the tire at the normal internal pressure; setting the test tire on a tire drum testing machine with the maximum allowable load exerted thereon; running the test tire at constant speed on the testing machine; and checked whether or not exfoliation had occurred in the decorative band after running 10,000 km and 30,000 km, respectively. "Good" represents that exfoliation had not occurred and "Poor" represents that exfoliation had occurred.

TABLE 1

|  | Example 1 tire | Example 2 tire | Example 3 tire | Example 4 tire | Example 5 tire | Example 6 tire | Example 7 tire |
|---|---|---|---|---|---|---|---|
| Side view | FIG. 4 | FIG. 2 | FIG. 2 | FIG. 2 | FIG. 2 | FIG. 2 | FIG. 2 |
| Brightness of the decorative line on outer side in tire radial direction (%) | 80 | 100 | 80 | 100 | 100 | 100 | 100 |
| Brightness of the decorative line on inner side in tire radial direction (%) | 90 | 70 | 60 | 70 | 70 | 70 | 70 |
| d/SH | 0.40 | 0.40 | 0.40 | 0.35 | 0.40 | 0.40 | 0.40 |
| $w_1(=w_2)$/SH | 0.03 | 0.03 | 0.03 | 0.03 | 0.02 | 0.01 | 0.10 |
| Ply end overlaps decorative band? | No | No | No | No | No | No | No |
| Visibility of decorative band (Number of viewers who answered that the apparent wheel rim diameter looked larger than the actual size) | B (13) | A (19) | B (16) | B (17) | A (18) | B (17) | A (19) |
| Durability of decorative band (after running 10,000 km) | Good | Good | Good | Good | Good | Good | Good |
| Durability of decorative band (after running 30,000 km) | Good | Good | Good | Good | Good | Good | Good |

|  | Example 8 tire | Example 9 tire | Example 10 tire | Comp. Example 1 tire | Comp. Example 2 tire | Comp. Example 3 tire | Comp. Example 4 tire |
|---|---|---|---|---|---|---|---|
| Side view | FIG. 2 | FIG. 2 | FIG. 2 | FIG. 2 | — | FIG. 2 | FIG. 2 |
| Brightness of the decorative line on outer side in tire radial direction (%) | 100 | 100 | 100 | 70 | 80 | 100 | 100 |
| Brightness of the decorative line on inner side in tire radial direction (%) | 70 | 70 | 70 | 60 | — | 70 | 70 |

TABLE 1-continued

| | | | | | | | |
|---|---|---|---|---|---|---|---|
| d/SH | 0.40 | 0.40 | 0.34 | 0.40 | 0.40 | 0.60 | 0.50 |
| $w_1(=w_2)$/SH | 0.11 | 0.03 | 0.03 | 0.03 | 0.03 | 0.03 | 0.03 |
| Ply end overlaps decorative band? | No | Yes | No | No | No | No | No |
| Visibility of decorative band (Number of viewers who answered that the apparent wheel rim diameter looked larger than the actual size) | A (19) | A (19) | B (15) | C (9) | B (11) | A (19) | A (18) |
| Durability of decorative band (after running 10,000 km) | Good | Good | Good | Good | Good | Poor | Poor |
| Durability of decorative band (after running 30,000 km) | Poor | Poor | Good | Good | Good | Poor | Poor |

It has been confirmed from the results of the tests that each of Example tires, in which: the outermost end in the tire radial direction of the decorative band is positioned on the inner side in the tire radial direction than the largest width position of the tire; the decorative band includes a plurality of decorative lines each extending in the tire circumferential direction and having higher brightness than the base color of the tire; brightness of the decorative line having the highest brightness among the decorative lines is at least 80%; and brightness and/or hue of the decorative line having the highest brightness is different from brightness and/or hue of at least one of other decorative lines, exhibits better visibility of the decorative band than Conventional Example tires.

REFERENCE SIGNS LIST

1: Bead portion
2: Sidewall portion
3: Tread portion
4: Bead core
6: Carcass ply
6e: End portion of carcass ply
10: Decorative band
10a: Outermost end in tire radial direction of decorative band
10b: Innermost end in tire radial direction of decorative band
11, 12, 111, 112: Decorative line
13, 113: Mark portion
14, 114: Gap
15, 16, 115, 116: Serial markings
21: Rim flange
22: Outer rim of disc portion

The invention claimed is:

1. A pneumatic tire comprising a pair of bead portions each having a bead core embedded therein, a pair of sidewall portions extending from the bead portions toward the outer side in the tire radial direction, a tread portion extending across the respective sidewall portions, and a decorative band having a smooth surface and formed on the sidewall portion, wherein:
the outermost end in the tire radial direction of the decorative band is positioned on the inner side in the tire radial direction than the largest width position of the tire;
the decorative band comprises a plurality of decorative lines each extending in the tire circumferential direction and having higher brightness than the base color of the tire;
the decorative line on the outermost side in the tire radial direction has the highest brightness of 100% among the decorative lines;
a width ($w_1$, $w_2$) in the tire radial direction of each decorative line of the decorative band is 2% to 10% of the cross sectional height SH of the tire; and
brightness and/or hue of the decorative line having the highest brightness is different from brightness and/or hue of at least one of other decorative lines.

2. The pneumatic tire of claim 1, wherein, provided that d represents a distance in the tire radial direction between the radially outermost end of the decorative band and the bead base line and SH represents a cross sectional height of the tire, $0.35 \times SH \leq d < 0.50 \times SH$.

3. The pneumatic tire of claim 1, wherein the decorative lines are disposed to be distanced from each other in the tire radial direction.

4. The pneumatic tire of claim 1, wherein an end portion of a carcass ply is disposed in a tire radial region other than a tire radial portion between the innermost end and the outermost end in the tire radial direction of the decorative band.

5. The pneumatic tire of claim 1, wherein a width in the tire radial direction of the decorative line having the highest brightness is narrower than a width in the tire radial direction of each of other decorative lines.

6. The pneumatic tire of claim 1, wherein the decorative line having the lowest brightness comprises a disconnected portion in which a mark is formed; and
the decorative line having the lowest brightness further comprises an enlarged width portion adjacent in the tire circumferential direction to the mark portion, so that the decorative portion terminates at the enlarged width portion.

7. The pneumatic tire of claim 1, wherein a contamination preventive layer, containing butyl-based rubber and inorganic clay minerals but not containing an antioxidant, is provided adjacent to the decorative band.

* * * * *